(12) United States Patent
Doering

(10) Patent No.: US 11,795,853 B2
(45) Date of Patent: Oct. 24, 2023

(54) EXHAUST GAS TURBINE AND METHOD OF OPERATING THE SAME

(71) Applicant: Andreas Doering, Unterhaching (DE)

(72) Inventor: Andreas Doering, Unterhaching (DE)

(*) Notice: Subject to any disclaimer, the term of this patent is extended or adjusted under 35 U.S.C. 154(b) by 0 days.

(21) Appl. No.: 17/525,922

(22) Filed: Nov. 14, 2021

(65) Prior Publication Data

US 2023/0151754 A1 May 18, 2023

(51) Int. Cl.
*F01N 3/20* (2006.01)
*F01D 25/24* (2006.01)
(Continued)

(52) U.S. Cl.
CPC ........ *F01N 3/2066* (2013.01); *B01F 23/2131* (2022.01); *B01F 25/3131* (2022.01); *B01F 25/31333* (2022.01); *B01F 25/4231* (2022.01); *B01F 27/0531* (2022.01); *B01F 27/112* (2022.01); *F01D 25/24* (2013.01); *B01F 2215/044* (2013.01); *B01F 2215/0422* (2013.01); *B01F 2215/0495* (2013.01); *F01N 2610/1453* (2013.01); *F05D 2300/611* (2013.01)

(58) Field of Classification Search
CPC ........... F01N 3/2066; F01N 2610/1453; B01F 23/2131; B01F 25/3131; B01F 25/31333; B01F 25/4231; B01F 27/0531; B01F 27/112; B01F 2215/0495; B01F 2215/0422; B01F 2215/044; F05D 2300/611; F01D 25/24
See application file for complete search history.

(56) References Cited

U.S. PATENT DOCUMENTS

| 5,116,579 A | * | 5/1992 | Kobayashi | ......... B01D 53/9495 422/111 |
| 6,883,308 B2 | * | 4/2005 | Megas | .................. F01N 3/2066 60/303 |

(Continued)

*Primary Examiner* — Jesse S Bogue
(74) *Attorney, Agent, or Firm* — Laurence A. Greenberg; Werner H. Stemer; Ralph E. Locher

(57) ABSTRACT

An exhaust gas turbine (30) for expanding exhaust gas, comprising a turbine housing (33) having an inflow housing portion (35) for exhaust gas to be expanded and an outflow housing portion (36) for expanded exhaust gas, a turbine rotor (34) received by the turbine housing (33), the turbine rotor (34) being rotatable about an axis of rotation, a metering means (42) for a reducing agent or a precursor substance of a reducing agent, wherein the reducing agent or the precursor substance can be introduced into the expanded exhaust gas via the metering device (42), and with a swirl atomizer (43), rotating together with the turbine rotor (34), for the reducing agent or the precursor substance, the reducing agent or the precursor substance being atomizable in the expanded exhaust gas via the swirl atomizer (43), the swirl atomizer (43) engaging the turbine rotor (34) at a downstream, hub-side portion of the turbine rotor (34). Downstream of the turbine rotor (34) in extension of the axis of rotation of the turbine rotor (34), an impingement body (44) is arranged for the reducing agent or the precursor substance introduced into the exhaust gas and atomized, wherein a distance of the impingement body (44) from the swirl atomizer (43) corresponds to at most 7 times a diameter of the turbine rotor (34).

15 Claims, 7 Drawing Sheets

Figure 1:
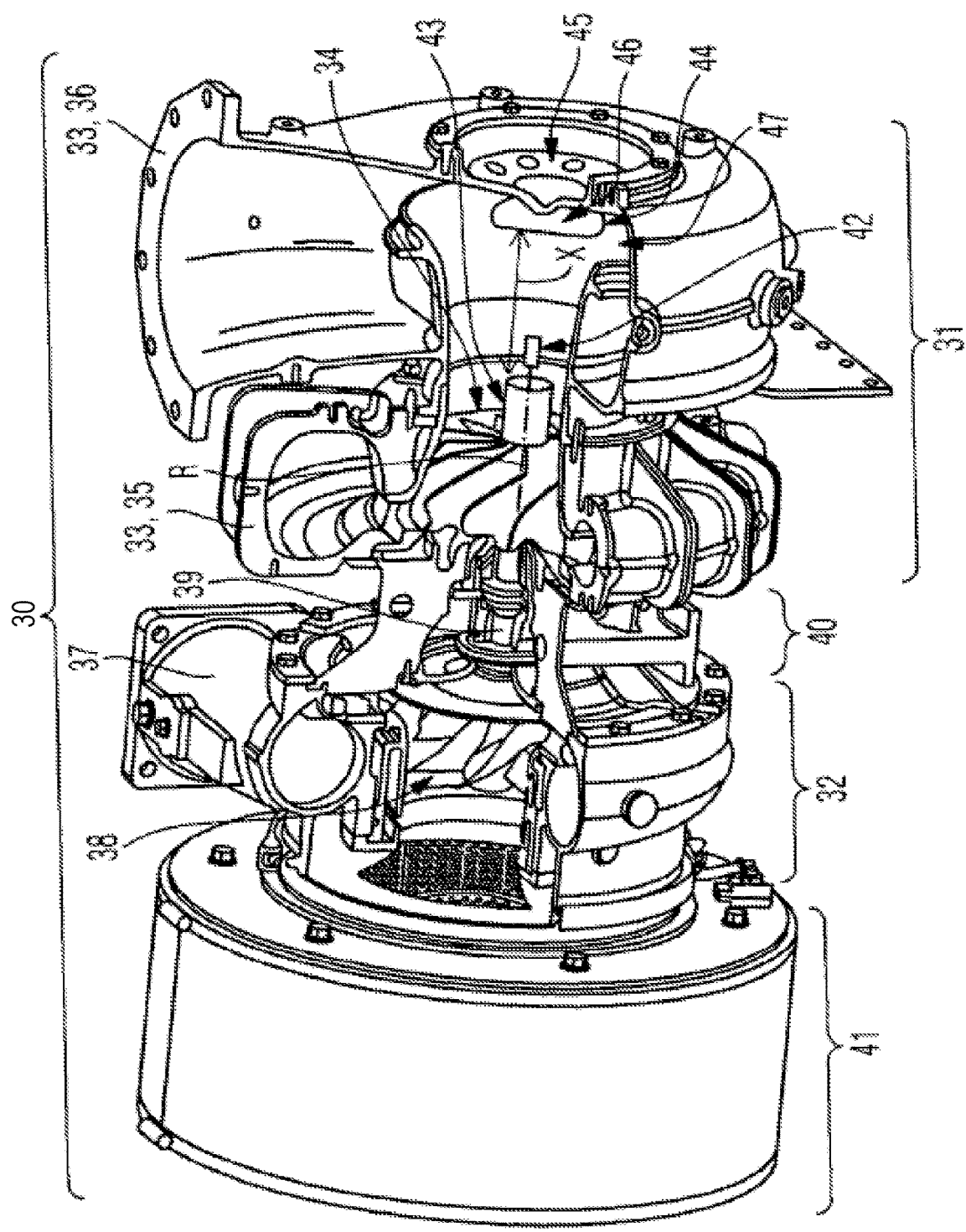

(51) Int. Cl.
*B01F 23/213* (2022.01)
*B01F 25/313* (2022.01)
*B01F 25/421* (2022.01)
*B01F 27/112* (2022.01)
*B01F 27/053* (2022.01)

(56) References Cited

U.S. PATENT DOCUMENTS

| | | | | |
|---|---|---|---|---|
| 8,596,063 | B2* | 12/2013 | Brown | F01N 3/2066 |
| | | | | 60/605.1 |
| 11,015,508 | B2* | 5/2021 | Halldorf | B05B 3/082 |
| 11,111,834 | B2* | 9/2021 | Kemmerling | F01N 3/206 |
| 2016/0076425 | A1* | 3/2016 | Goffe | B01F 25/431 |
| | | | | 60/295 |
| 2019/0316509 | A1* | 10/2019 | Halldorf | F02B 37/18 |
| 2021/0047957 | A1* | 2/2021 | Norris | F01N 3/2066 |

* cited by examiner

EXHAUST GAS TURBINE AND METHOD OF OPERATING THE SAME

The invention relates to an exhaust gas turbine. Furthermore, the invention relates to a method for operating an exhaust gas turbine.

The basic structure of an exhaust gas turbocharger is known from DE 10 2016 125 189 A1. An exhaust gas turbocharger has an exhaust gas turbine for expanding exhaust gas of an internal combustion engine, wherein energy is obtained during the expansion of the exhaust gas. Further, the exhaust gas turbocharger comprises a compressor for compressing charge air to be supplied to the internal combustion engine, using the energy obtained when the exhaust gas is expanded. The exhaust gas turbine has a turbine housing and a turbine rotor. The compressor has a compressor housing and a compressor rotor. The turbine rotor and compressor rotor are coupled via a while, which is supported in a bearing housing.

From WO 2018/080371 A1 an exhaust gas turbine of an exhaust gas turbocharger is known, which has a dosing device for reducing agent or a precursor substance of a reducing agent. Via this metering device, the reducing agent or the precursor substance can be introduced into the exhaust gas expanded in the exhaust gas turbine, the metering device directing the reducing agent or the precursor substance onto a swirl atomizer which engages the turbine rotor at a hub-side section of the turbine rotor and rotates together with the turbine rotor. The swirl atomizer can be used to atomize the reducing agent or the precursor substance of the reducing agent in the expanded exhaust gas. The reducing agent is used to reduce nitrogen oxides in the exhaust gas, in particular in the region of an SCR catalytic converter which is arranged downstream of the exhaust gas turbine and to which the expanded exhaust gas can be fed together with the reducing agent atomized in the exhaust gas.

There is the problem that deposits of solid components of the reducing agent or of the precursor substance of the reducing agent form on assemblies of the exhaust gas turbine, for example on the swirl atomizer, the metering device or also on the turbine housing, such as deposits of urea decomposition products like cyanuric acid or melamine. This is disadvantageous.

There is therefore a need for an exhaust gas turbine in which the risk of deposits forming on components thereof from solid components of the reducing agent or the precursor substance of the reducing agent is reduced.

From this, the invention is based on the task of creating a novel exhaust gas turbine and a method for operating the same.

According to a first aspect, this task is solved by an exhaust gas turbine according to claim 1. According to this, the exhaust gas turbine has, downstream of the turbine rotor in extension of the axis of rotation of the turbine rotor, an impingement body for the reducing agent or the precursor substance introduced into the exhaust gas and atomized, which impingement body is arranged at a defined distance from the swirl atomizer, the defined distance of the impingement body from the swirl atomizer corresponding to at most 7 times a diameter of the turbine rotor.

By providing the impingement body downstream of the turbine rotor in extension of the axis of rotation of the turbine rotor with a defined distance between the impingement body and the swirl atomizer in the direction of the axis of rotation, an effective atomization of the reducing agent or of the precursor substance of the reducing agent in the expanded exhaust gas can be ensured, which reduces the risk of deposits of solid components of the reducing agent or of the precursor substance forming on the swirl atomizer, the metering device and the turbine housing.

According to an advantageous further development of the first aspect, the distance between the swirl body and the swirl atomizer, as seen in the direction of the axis of rotation of the turbine rotor, corresponds to a maximum of 6 times, preferably a maximum of 5 times, particularly preferably a maximum of 4 times, the diameter of the turbine rotor. This distance between the impingement body and the swirl atomizer is particularly advantageous.

According to an advantageous further development of the first aspect, the impingement body is thermally decoupled from the turbine housing. Preferably, the impingement body is flowed against on a first side by exhaust gas expanded in the exhaust gas turbine with the reducing agent or the precursor substance atomized in the expanded exhaust gas and on an opposite second side by exhaust gas not expanded in the exhaust gas turbine. The thermal decoupling of the impingement body and turbine housing reduces the risk of deposits of solid components of the reducing agent or precursor substance forming on the impingement body. Then, when the second side of the impingement body is flowed against by non-expanded and thus hotter exhaust gas from upstream of the exhaust turbine, any such deposits that may form on the first side of the impingement body can be effectively thermally decomposed.

According to a second aspect, this task is solved by an exhaust gas turbine. According to this aspect, the swirl atomizer has a cavity and, on a wall bounding the cavity and extending parallel to the axis of rotation of the turbine rotor or at an acute angle of at most 40° to the axis of rotation of the turbine rotor, openings through which the reducing agent or the precursor substance enters the expanded exhaust gas from the cavity. This design of the swirl atomizer can also reduce the risk of deposits of solid components of the reducing agent or the precursor substance of the reducing agent forming on assemblies of the exhaust gas turbine. This embodiment is further particularly preferred for effective atomization of the reducing agent or the precursor substance thereof.

According to an advantageous further development of the second aspect, the openings are arranged in at least two planes offset as viewed in the direction of the axis of rotation of the turbine rotor, with partition walls preferably being arranged between the offset planes and projecting inwardly into the swirl atomizer. This further development permits particularly effective atomization of the precursor substance of the reducing agent or of the reducing agent in the expanded exhaust gas.

According to an advantageous further development of the second aspect, at least one opening has a longitudinal central axis that differs from other openings. This further development also permits a particularly effective atomization of the precursor substance of the reducing agent or of the reducing agent in the expanded exhaust gas.

Preferably, both aspects are used in combination with each other on an exhaust gas turbine.

Methods according to the invention for operating an exhaust gas turbine are defined in the claims.

Preferred further embodiments of the invention are apparent from the subclaims and the following description. Examples of embodiments of the invention are explained in more detail, without being limited thereto, by reference to the drawing.

Figure 2:
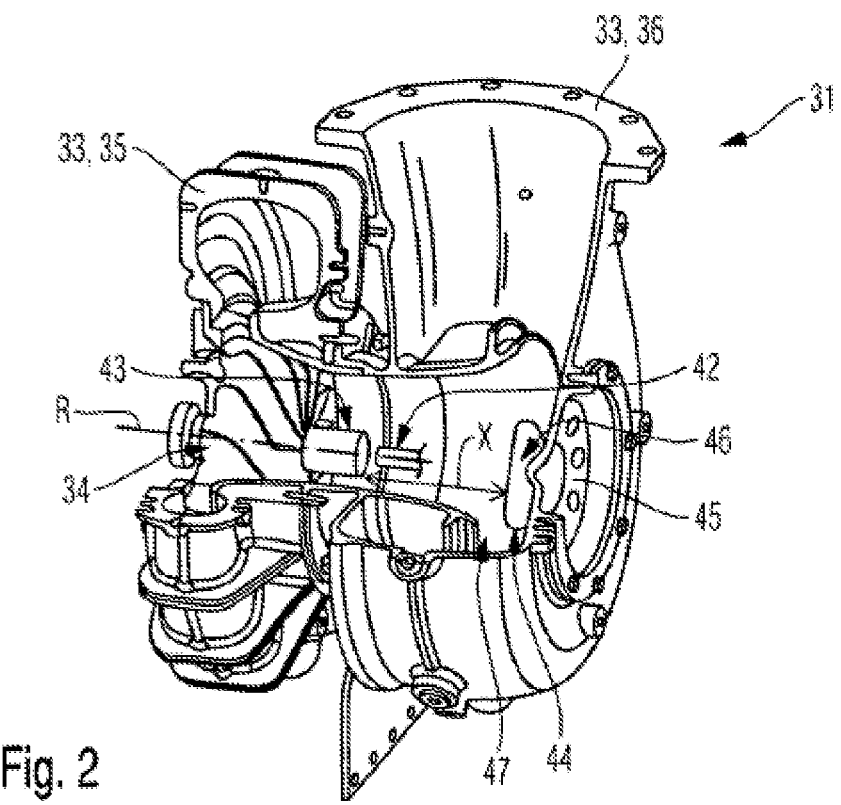
Figure 3:
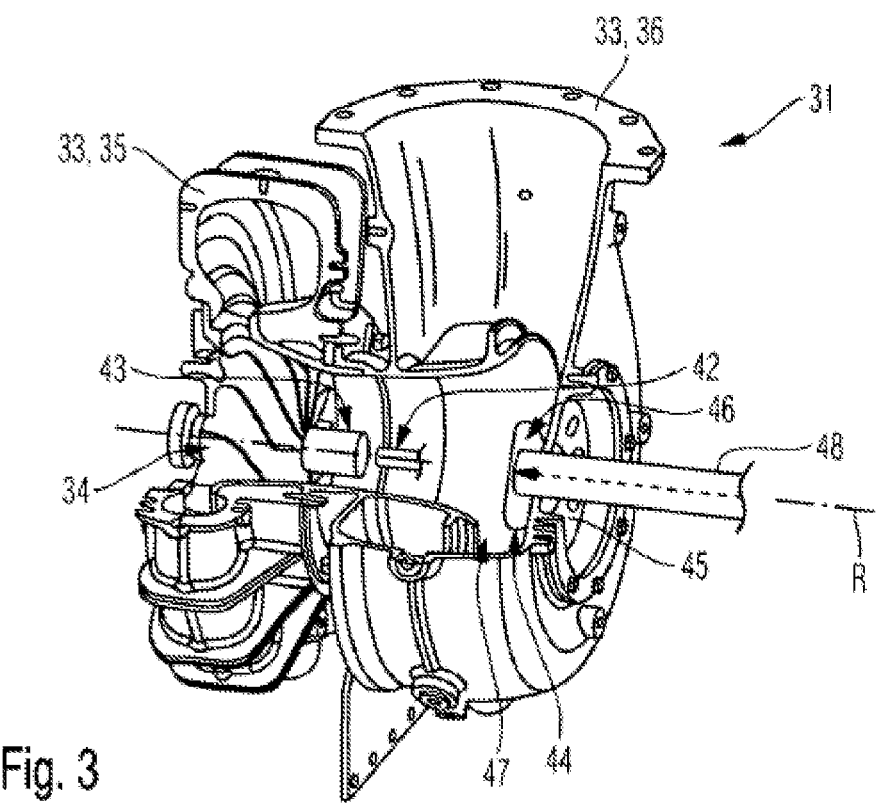

Thereby shows:

FIG. 1 a perspective view of an exhaust gas turbocharger comprising an exhaust gas turbine according to the invention, FIG. 2 a perspective view of a further exhaust gas turbine according to the invention, FIG. 3 a further development of FIG. 1

Figure 4:
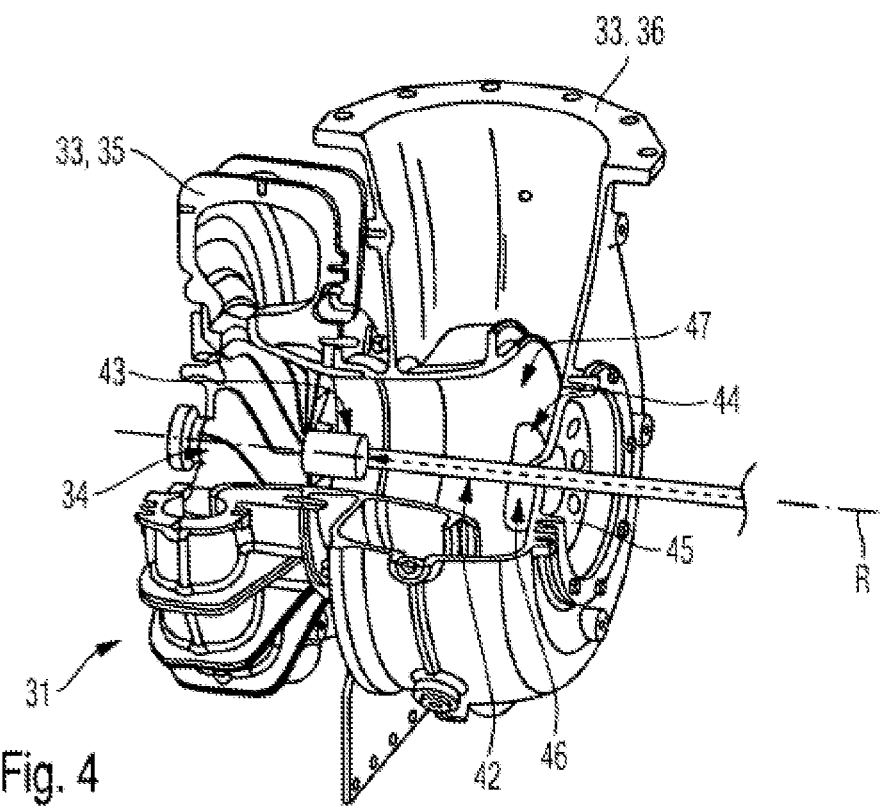

FIG. 4 a further development of FIG. 1

Figure 5:
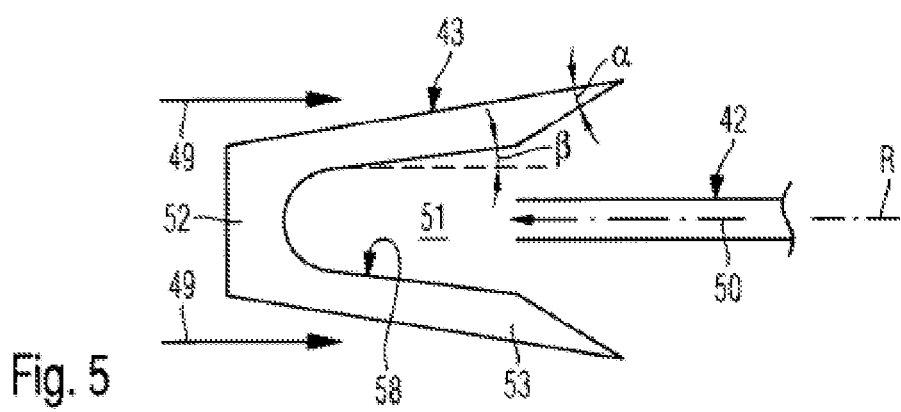
Figure 6:
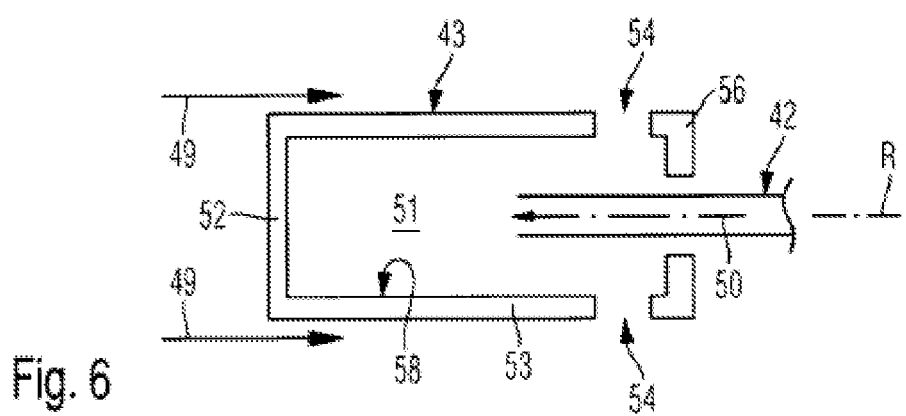
Figure 7:
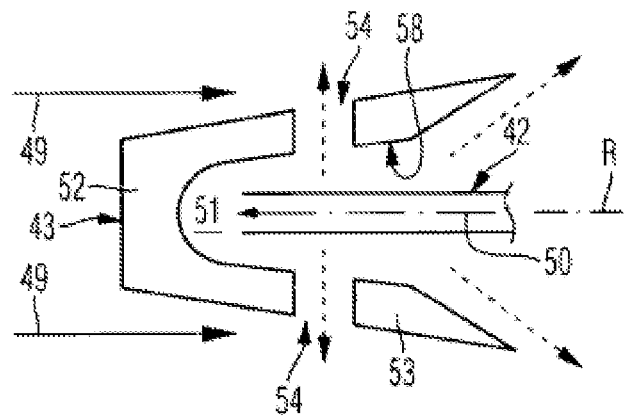
Figure 8:
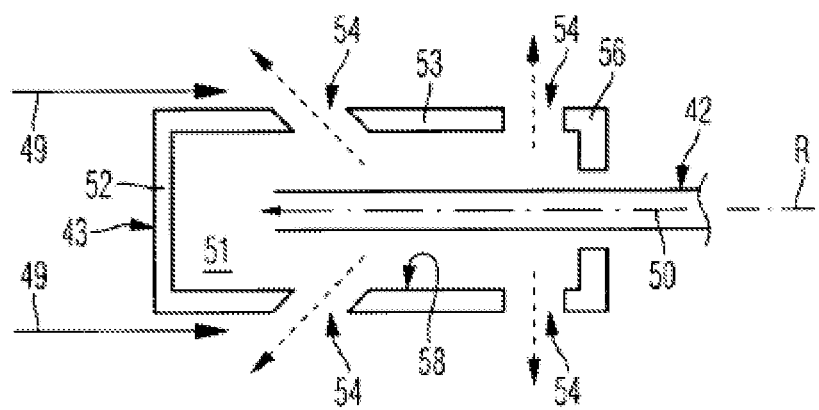
Figure 9:
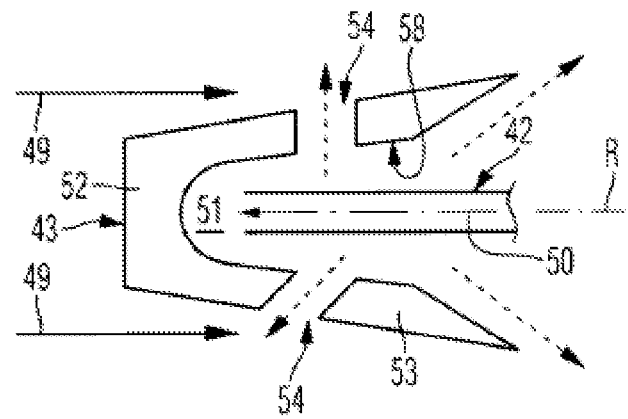
Figure 10:
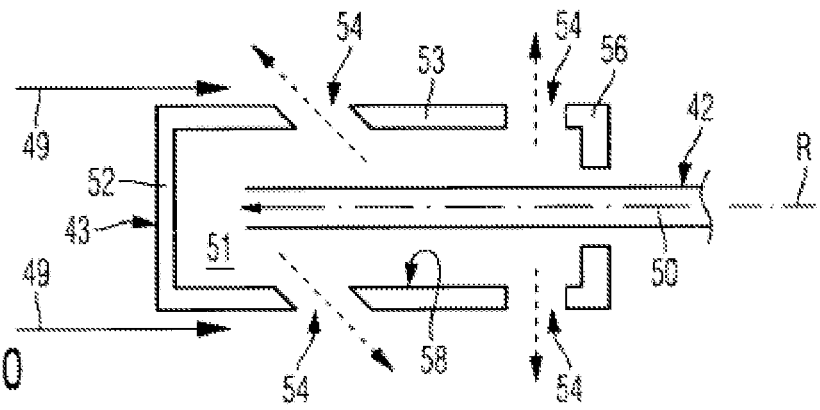
Figure 11:
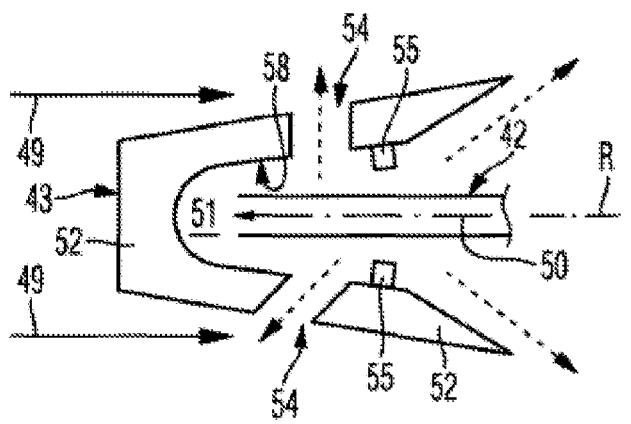
Figure 12:
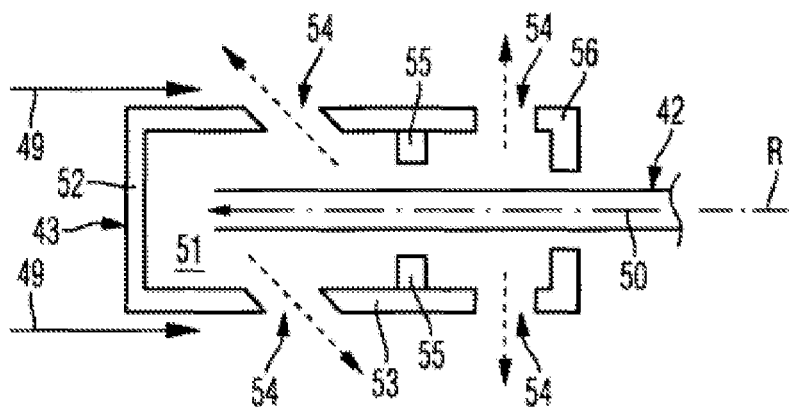
Figure 13:
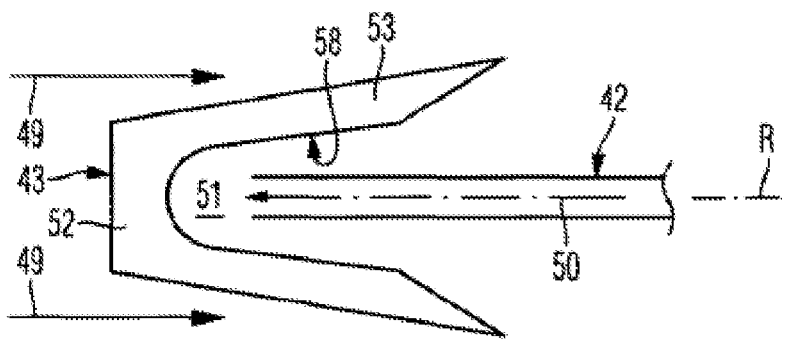
Figure 14:
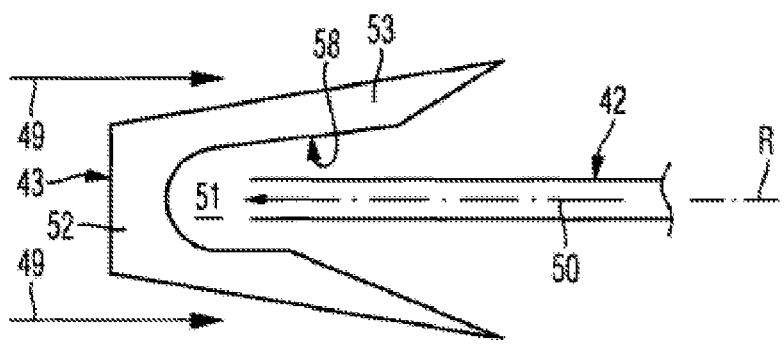
Figure 15:
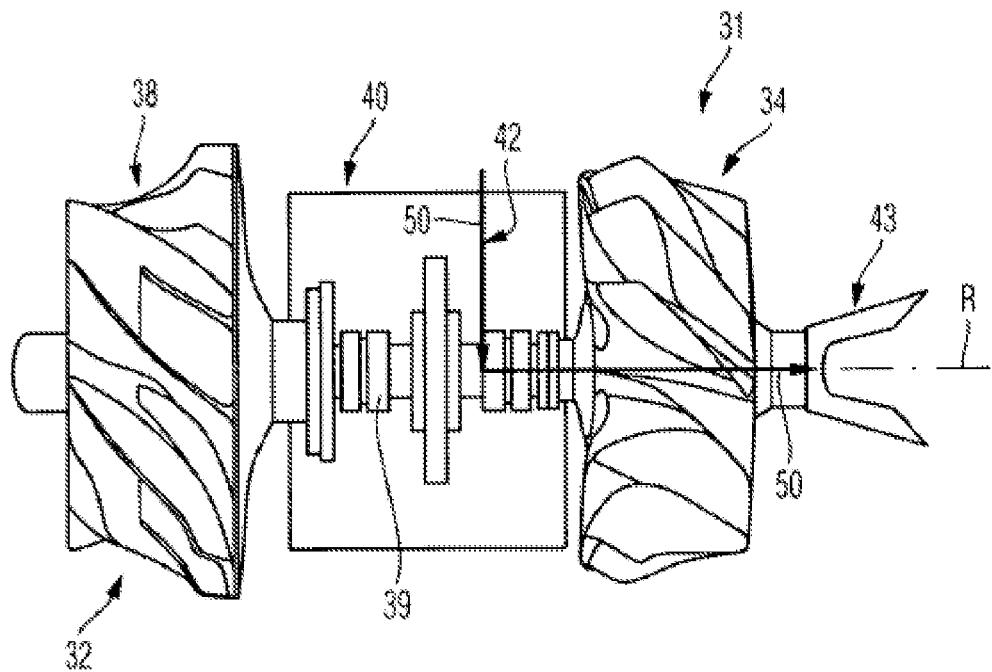
Figure 16:
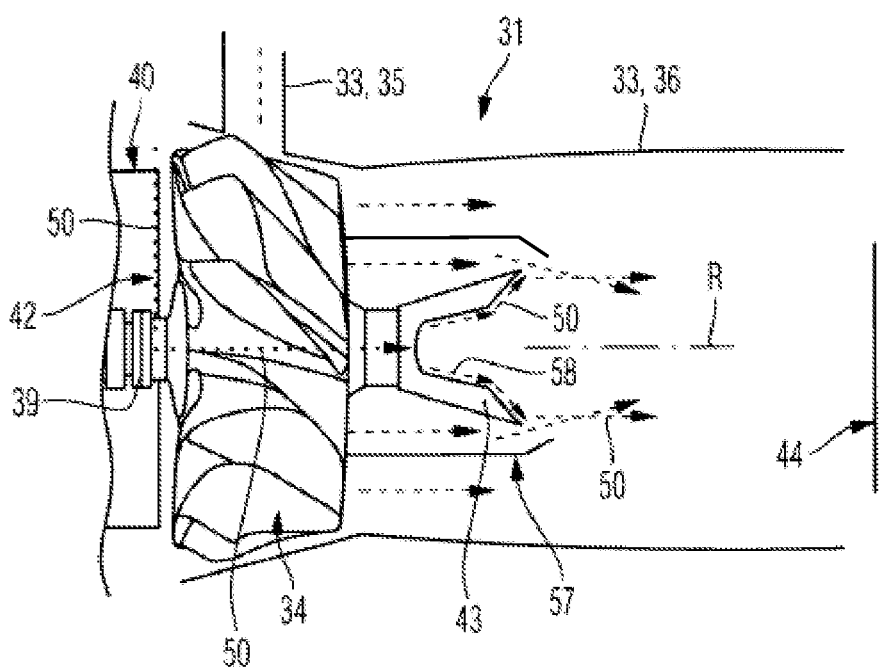

FIG. 5 a cross-section through a swirl atomizer of an exhaust gas turbine according to the invention, FIG. 6 a cross-section through a further swirl atomizer of an exhaust gas turbine according to the invention, FIG. 7 a cross-section through a further swirl atomizer of an exhaust gas turbine according to the invention, FIG. 8 a cross-section through a further swirl atomizer of an exhaust gas turbine according to the invention, FIG. 9 a cross-section through a further swirl atomizer of an exhaust gas turbine according to the invention, FIG. 10 a cross-section through a further swirl atomizer of an exhaust gas turbine according to the invention, FIG. 11 a cross-section through a further swirl atomizer of an exhaust gas turbine according to the invention, FIG. 12 a cross-section through a further swirl atomizer of an exhaust gas turbine according to the invention, FIG. 13 a cross-section through a further swirl atomizer of an exhaust gas turbine according to the invention, FIG. 14 a cross-section through a further swirl atomizer of an exhaust gas turbine according to the invention, FIG. 15 assemblies of a further exhaust gas turbocharger comprising an exhaust gas turbine according to the invention, FIG. 16 a further development of FIG. 15

Figure 17:
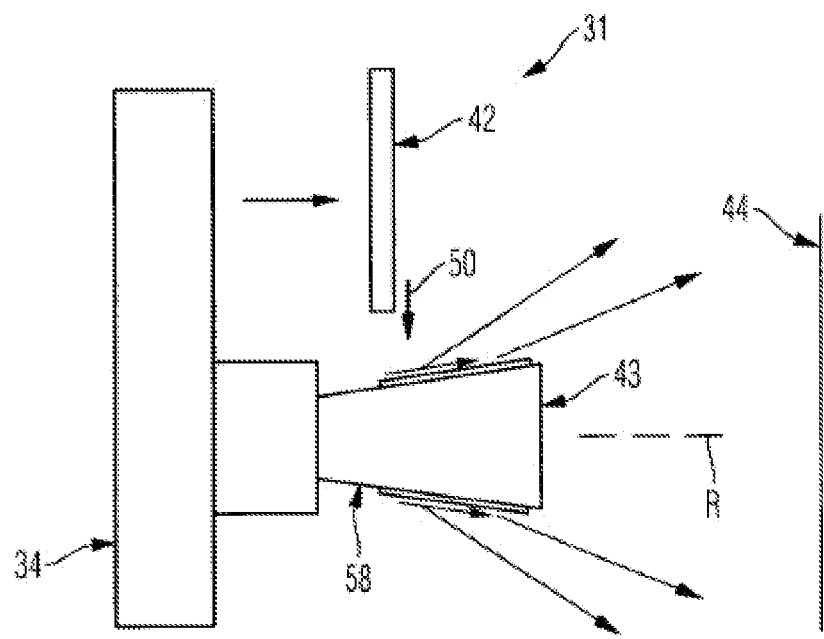
Figure 18:
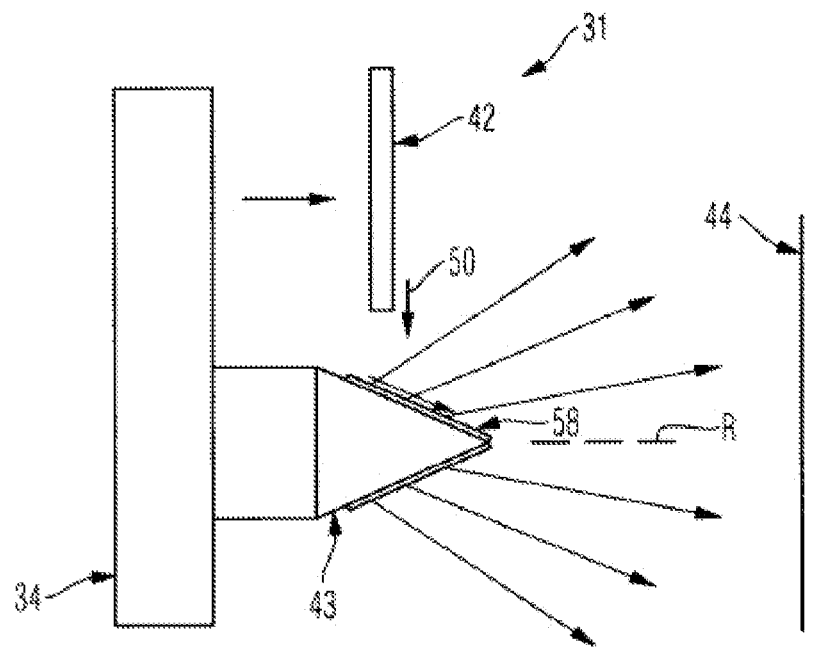

FIG. 17 assemblies of a further exhaust gas turbine according to the invention, FIG. 18 assemblies of a further exhaust gas turbine according to the invention.

The invention relates to an exhaust gas turbine which is, in particular, a component of an exhaust gas turbocharger of an internal combustion engine, in particular an internal combustion engine operated with diesel fuel or heavy oil.

FIG. 1 shows an exhaust gas turbocharger 30 with an exhaust gas turbine 31 according to the invention, which serves to expand exhaust gas of an internal combustion engine. Furthermore, the exhaust gas turbocharger 30 comprises a compressor 32 for compressing charge air to be supplied to the internal combustion engine, in which case the energy obtained in the exhaust gas turbine 31 during the expansion of the exhaust gas is utilized.

The exhaust gas turbine 31 has a turbine housing 33 and a turbine rotor 34, the turbine rotor 34 being rotatable about an axis of rotation R. The turbine housing 33 has a rotor 34. The turbine housing 33 has an inflow housing section 35 and an outflow housing section 36, wherein exhaust gas to be expanded can be supplied to the turbine rotor 34 via the inflow housing section 35, and wherein exhaust gas expanded from the turbine rotor 34 can be discharged via the outflow housing section 36. The exhaust gas turbine 31 shown in FIG. 1 is a radial turbine in which the exhaust gas to be expanded flows radially against the turbine rotor 34 via the inflow housing section 35. The expanded exhaust gas is discharged in the axial direction from the turbine rotor 34.

The compressor 32 has a compressor housing 37 and a compressor rotor 38. The compressor rotor 38 is coupled to the turbine rotor 34 via a shaft 39, which is supported in a bearing housing 40 of the exhaust gas turbocharger 30. The rotational axis R of the turbine rotor 34 corresponds to a rotational axis R of the compressor rotor 38 and the rotational axis of the shaft 39.

The bearing housing 40 is connected to both the compressor housing 37 and the turbine housing 33, namely the inflow housing portion 35 thereof. Furthermore, FIG. 1 shows a muffler 41 connected to the compressor housing 37, wherein the charge air is guided via the muffler 41.

After leaving the exhaust gas turbocharger 30, the exhaust gas expanded in the exhaust gas turbine 31 is directed toward a catalytic converter (not shown), in particular toward an SCR catalytic converter, in order to reduce the nitrogen oxide content in the exhaust gas. The reducing agent required for the selective catalytic reduction in the SCR catalytic converter or a precursor substance of the reducing agent can be introduced into the expanded exhaust gas in the region of the exhaust gas turbine 31 downstream of the turbine rotor 34 via a metering device 42 of the exhaust gas turbine 31, wherein in FIG. 1 the metering device 42 introduces the reducing agent or the precursor substance of the reducing agent into the exhaust gas in the direction opposite to the direction of flow of the expanded exhaust gas in the direction of the axis of rotation R of the turbine rotor 34.

The exhaust gas turbine 31 according to the invention further has a swirl atomizer 43 for the reducing agent or the precursor substance of the reducing agent introduced into the expanded exhaust gas via the metering device 42, the swirl atomizer 43 engaging the turbine rotor 34 at a downstream section of the turbine rotor 34, as viewed in the flow direction of the exhaust gas, and rotating together with the turbine rotor 34. Via the swirl atomizer 43, the reducing agent or the precursor substance of the reducing agent, which is directed to the swirl atomizer 43 via the metering device 42, can be atomized in the expanded exhaust gas.

According to a first aspect of the invention, the exhaust gas turbine 31 has, viewed in the direction of flow of the exhaust gas downstream of the turbine rotor 34 in extension of the axis of rotation R of the turbine rotor 34, an impingement body 44 for the reducing agent or the precursor substance of the reducing agent, wherein, viewed in the direction of the axis of rotation R of the turbine rotor 34, a distance X in the direction of the axis of rotation R (see FIGS. 1, 2) between the impingement body 44 and the swirl atomizer 43 corresponds to a maximum of 7 times a diameter of the turbine rotor 34.

In particular, the distance X of the impingement body 44 from the swirl atomizer 43, viewed in the direction of the axis of rotation R of the turbine rotor 34, corresponds to a maximum of 6 times the diameter of the turbine rotor 34, preferably to a maximum of 5 times the diameter of the turbine rotor 34, particularly preferably to a maximum of 4 times the diameter of the turbine rotor 34.

The impingement body 44 is plate-like in the embodiment example of FIG. 1.

The impingement body 44 is an assembly separate from the turbine housing 33, mounted on the turbine housing 33 and preferably thermally decoupled from the turbine housing 33. Thus, it can be seen from FIG. 1 that a gap 46 is formed between the impingement body 44 and a sealing body 45 of the discharge housing section 36 of the turbine housing 33, which gap serves to thermally decouple the impingement body 44 from the turbine housing 33.

The impingement body 44 is positioned in a deflection region 47 of the outflow housing section 36 of the turbine housing 33, wherein in this deflection region 47 the expanded exhaust gas, which flows axially away from the turbine rotor 34, is deflected, namely by at least 70°, preferably by at least 80°, particularly preferably by at least 89°, with respect to the axis of rotation R.

The baffle 44, which is preferably thermally decoupled from the turbine housing 33, can prevent reducing agent or the precursor substance of the reducing agent from reaching the turbine housing 33 and solid components of the reducing agent or the precursor substance of the reducing agent, in particular solid urea decomposition products such as cyanuric acid or melamine, from settling or depositing on the turbine housing 33.

The impingement body 44, which is preferably thermally decoupled from the turbine housing 33, has a higher temperature than the turbine housing 33, so that droplets of the reducing agent or precursor substance that reach the impingement body 44 can be effectively decomposed. In this context, the defined distance x of the impingement body 44 from the swirl atomizer 43 is of particular advantage in counteracting the formation of such deposits.

FIG. 2 shows a further development of the embodiment example of FIG. 1, in which the impingement body 44, in contrast to FIG. 1, is not plate-like or flatly contoured, but rather trough-like or concavely curved as seen in the direction of flow of the exhaust gas downstream of the turbine rotor 34. In this case, the impingement body 44 can be designed as a hollow sphere segment.

FIG. 3 shows a further development of the embodiment example of FIG. 1, in which exhaust gas is introduced into the gap 46 between the impingement body 44 and the sealing body 45 of the turbine housing 33 via a feed device 48, namely relatively hot exhaust gas which has not been expanded in the exhaust gas turbine 31.

In this case, the impingement body 44 is then flown against on a first side facing the turbine rotor 34 by the exhaust gas expanded in the exhaust gas turbine 31 with the reducing agent atomized in the expanded exhaust gas or the atomized precursor substance of the reducing agent, whereas the impingement body is flown against on an opposite second side facing away from the turbine rotor 34 by non-expanded exhaust gas which is hotter than the expanded exhaust gas.

The further embodiment of FIG. 3 permits a particularly advantageous thermal decoupling of the impingement body 44 from the turbine housing 33 and a particularly effective decomposition of droplets of the reducing agent or the precursor substance of the reducing agent which reach the first side of the impingement body 44.

Whereas in the embodiment of FIG. 1 the thermal decoupling of the impingement body 44 and turbine housing 33 takes place via an air gap insulation, in the embodiment of FIG. 3 it is additionally provided to flow hot exhaust gas to the impingement body 44 on the side facing away from the turbine rotor 34 and thus to heat the same from the back side. The exhaust gas, which can be fed to the impingement body 44 via the feed device 48, can be branched off upstream of the turbine rotor 34, for example from the feed housing section 35 of the turbine housing 33. It is particularly advantageous to extract the exhaust gas supplied via the feed device 48 upstream of the exhaust rotor 34, since a higher pressure level prevails there than downstream of the exhaust rotor or in the region of the impingement body 44. This means that a conveying device for the hot exhaust gas can be dispensed with.

FIG. 4 shows a further advantageous further development of the exhaust gas turbine 31 of FIG. 1.

In the further development of FIG. 4, it is shown that the metering device 42 extends through the impingement body 44 and accordingly extends in the region of the turbine housing 33 exclusively in the axial direction of the axis of rotation R of the turbine rotor 34. Thereby, the metering device 42 also extends through the sealing body 45 of the turbine housing 33.

With the above features of the exhaust gas turbine 31 according to the invention, it can be avoided that deposits of solid decomposition products of the reducing agent or of the precursor substance of the reducing agent, such as, for example, cyanuric acid or melamine, are deposited in particular on the impingement body 44 and the turbine housing 33 and on the metering device 42 preferably also on the swirl atomizer 43.

The effectiveness of atomizing the reducing agent or the precursor substance of the reducing agent in the exhaust gas can be increased if the swirl atomizer 43 is designed as shown in FIGS. 5 to 14. In this context, FIGS. 5 to 14 show preferred design variants for the swirl atomizer 43 together with the metering device 42, where in FIGS. 5 to 14 arrows 49 visualize the flow of the expanded exhaust gas in the region of the swirl atomizer 43 and arrows 50 visualize the feed of the reducing agent or the precursor substance of the reducing agent to the swirl atomizer 43.

The swirl atomizers 43 of FIGS. 5 and 6 each have a cavity 51, and the reducing agent 50 is introduced into this cavity 51 via the metering device 42 and then atomized via the swirl atomizer 43 and moved toward the impingement body 44. In FIG. 5, the swirl atomizer 43 is bell-shaped or cup-shaped, with walls 52, 53 of the swirl atomizer 43 delimiting the cavity 51 thereof. Thus, the swirl atomizer 43 of FIG. 5 has a bottom wall 52 which is completely closed in FIG. 5 and which extends perpendicularly to the axis of rotation R of the turbine rotor 34 and thus to the axis of rotation of the swirl atomizer 43. A tubular wall 53 extends from this bottom wall 52, which extends parallel or with an acute angle 6 to the axis of rotation R of the turbine rotor 34 or swirl atomizer 43, this acute angle 6 being a maximum of 40°, preferably a maximum of 30°, preferably a maximum of 20°, particularly preferably a maximum of 10°. This wall 53 extends from the bottom wall 52 in the direction of the swirl atomizer 44. In order to ensure a particularly effective atomization of the reducing agent 50 or of the precursor substance of the reducing agent via the swirl atomizer 43, it is provided in the embodiment example of FIG. 5 that free ends of the wall 53, which face the swirl atomizer 44, enclose between a radially outer region and a radially inner region of the wall 53 an acute angle α which is at most 60°, preferably at most 45°, particularly preferably at most 35°. In FIG. 5, the swirl atomizer 43 is open at the end opposite the bottom wall 52, and is thus designed in the form of an open cup or an open bell.

FIG. 7 shows a further development of the swirl atomizer 43 of FIG. 5, wherein in the embodiment example of FIG. 7 according to a second aspect of the invention it is provided that the wall 53 of the swirl atomizer 43, which extends parallel to the axis of rotation or with the acute angle β oblique to the axis of rotation R of the turbine rotor 34 or swirl atomizer 43, has openings 54 through which the reducing agent or the precursor substance of the reducing agent enters the expanded exhaust gas from the cavity 51.

Hereby, a particularly advantageous atomization of the reducing agent or the precursor substance of the reducing agent can be ensured, whereby the risk of deposits of decomposition products of the reducing agent or the precursor substance of the reducing agent forming on the impingement body 44 or on the turbine housing 36 or on the swirl atomizer 43 can be reduced.

It should be noted that this second aspect of the invention is preferably used in combination with the first aspect of the invention on an exhaust gas turbine 31. However, the two aspects of the invention may also be used independently.

FIG. 9 shows a modification of the swirl atomizer 43 of FIG. 7, according to which the openings 54 shown in FIG. 9 in the region of the wall 53 have orientations or longitudinal central axes that differ from one another. Hereby, the atomization of the reducing agent 50 or the precursor substance of the reducing agent 50 can be further improved. In FIGS. 7 and 9, the dashed arrows illustrate in which direction the atomized reducing agent 50 exits the cavity 51 of the respective swirl atomizer 43 and enters the exhaust gas 49. In FIGS. 7 and 9, the exhaust gas can exit the cavity 51 of the swirl atomizer 43 on the one hand at the open end of the swirl atomizer 43 and on the other hand via the openings 54 in two planes offset as seen in the direction of the axis of rotation R of the turbine rotor 34 or swirl atomizer 43.

FIG. 11 shows a further development of the swirl atomizer 43 of FIG. 9, in which partition walls 55 are formed between the outlet planes offset as viewed in the direction of the axis of rotation of the turbine rotor 34 or swirl atomizer 43, which partition walls are directed inward into the cavity 51 starting from the wall 53.

In the case of a relatively small quantity of reducing agent 50 introduced into the swirl atomizer 43, these partition walls 55 ensure that all reducing agent 50 first exits the cavity 51 via the openings 54 and enters the exhaust gas 59.

In the case of a larger quantity of reducing agent and/or in the case of low rotational speeds of the swirl atomizer 43, the level of reducing agent to be atomized in the cavity 51 can increase to such an extent that the reducing agent to be atomized then overcomes the partition walls 55 and flows to the right in FIG. 11, in order to then also exit the cavity 51 of the swirl atomizer 43 via the open end of the latter and enter the exhaust gas 49. For this purpose, it is significant that the outlet opening of the metering device 42 is positioned in the cavity 51 of the swirl atomizer 43 in such a way that the same lies between the bottom wall 52 and the partition walls 55.

FIGS. 5, 7, 9 and 11 all show swirl atomizers 43 which are open at their end opposite the base wall 52, i.e. which are contoured in the form of an open cup or an open bell. In contrast, FIGS. 6, 8, 10 and 12 show variations of swirl atomizers 43 which are closed at their end opposite the bottom wall 52 by a further wall 56, whereby in FIGS. 6, 8, 10 and 12 the metering device 42 extends through this closed wall 56 opposite the bottom wall 52. Accordingly, here the dosing device 43 is contoured in the form of a closed cup or a closed bell.

In the embodiment examples of FIGS. 6, 8, 10 and 12, the tubular wall 53 extending between the closed walls 52 and 56 extends parallel to the axis of rotation R of the turbine rotor 34 or swirl atomizer 43, wherein in this tubular wall 53, the openings 54 are made through which the reducing agent 50 or the precursor substance of the reducing agent 50 emerges from the cavity 51 of the respective swirl atomizer 43 and enters the exhaust gas 49. The tube-like wall 53 extends parallel or at an acute angle $\beta$ to the axis of rotation R of the turbine rotor 34 or swirl atomizer 43, this acute angle $\beta$ being a maximum of 40°, preferably a maximum of 30°, preferably a maximum of 20°, particularly preferably a maximum of 10°.

In FIGS. 8, 10 and 12, these openings 54 are positioned in different planes, namely in at least two planes offset as seen in the direction of the axis of rotation R of the turbine rotor 34 or swirl atomizer 43. In FIG. 12, the partition walls 55 are again formed between these planes in accordance with FIG. 11, which extend from the wall 53 inwardly into the cavity 51 of the swirl atomizer 43.

With all the swirl atomizers 43 shown, it is possible to atomize the reducing agent 50 or the precursor substance thereof in a particularly advantageous manner and to introduce it into the expanded exhaust gas 49, avoiding a hollow spray cone of atomized reducing agent 50 or of atomized precursor substance of the reducing agent. Avoiding such a hollow spray cone ensures that no circular deposit line of reducing agent or precursor substance of reducing agent is formed on the baffle 44, which is preferably used in combination with the swirl atomizer 43. The openings 54 in the wall 53 of the respective swirl atomizer 43 are particularly effective in counteracting the formation of a hollow spray cone of atomized reducing agent or atomized precursor substance, and these openings 54 can have different orientations, i.e. can run with different orientations with respect to the axis of rotation R of the swirl atomizer 43. Longitudinal central axes of the openings 54 may extend perpendicularly or inclinedly to the direction of flow of the expanded exhaust gas 49.

While in FIGS. 5 to 12 the swirl atomizers 43 shown are all rotationally symmetrical except for the orientation of the openings 54, FIGS. 13 and 14 show variations of the swirl atomizer 43 of FIG. 5 which are not rotationally symmetrical in the region of the open end and thus of a break-off edge of the swirl atomizer 43. Here, too, the formation of a hollow spray cone of atomized reducing agent can be advantageously counteracted. In FIG. 13, the wall 53 is of different lengths when viewed in the axial direction of the wall 53. In FIG. 14, different angles $\alpha$ are provided in the region of the tear-off edge or the free end of the wall 53 between the radially outer and the radially inner region of the wall 53.

It may be provided that guide grooves or guide grooves for the reducing agent or the precursor substance of the reducing agent are formed on the wall 53, namely a radially inner surface 58 of the wall 53, adjacent to the cavity 51 of the respective swirl atomizer 54, these guide grooves or guide grooves extending in the direction of the rotation of the wall 53. guide grooves extend straight or helically in the direction of the axis of rotation R of the respective swirl atomizer 43 and guide the reducing agent 50 or the precursor substance of the reducing agent 50, which is introduced into the cavity 51 of the respective swirl atomizer 43 via the metering device 42, in the direction of the open end or the openings of the swirl atomizer 43. Such guide grooves or guide grooves can be used in all swirl atomizers 43 of FIGS. 5 to 14.

In the embodiment examples of FIGS. 1 to 14, the metering device 42 feeds the reducing agent or precursor substance to the swirl atomizer 43 in the opposite direction to the flow direction of the expanded exhaust gas and in the direction of the rotational axis R of the turbine rotor 43. In contrast, FIGS. 15 and 16 show embodiments in which the respective metering device 42 feeds the reducing agent or the precursor substance to the respective swirl atomizer 43 in the direction of flow of the expanded exhaust gas and in the direction of the axis of rotation R of the turbine rotor 34 and thus swirl atomizer 43.

In FIGS. 15, 16, the reducing agent or precursor substance is fed through the shaft 39 mounted in the bearing housing 40 and through the hub of the turbine rotor 34. This has the advantage that assemblies of the feed device 42, which are arranged downstream of the turbine rotor 43, can be dispensed with completely. There is then no risk whatsoever of deposits of decomposition products of the reducing agent or the precursor substance of the reducing agent being deposited on the metering device 42, which could lead to clogging of the metering device 42.

FIG. 16 shows a further development of the embodiment of FIG. 15, in which the swirl atomizer 43 is surrounded radially on the outside by a guiding device 57, at least in sections. Such a guiding device 57 allows the atomized reducing agent or the atomized precursor substance of the reducing agent to be concentrated in a narrower region within the expanded exhaust gas. Further, the reducing agent 50 is prevented from reaching the downstream housing section 36 of the turbine housing 33. This embodiment is not limited to the supply of the reducing agent via the shaft 39, but can also be applied in the embodiments shown in FIGS. 1-14 of supplying the reducing agent in the opposite direction to the direction of flow.

Preferably, the guiding device 57 is designed such that the flow velocity of the exhaust gas in the region of deflection thereof, i.e., in the deflection region 47 of the exhaust housing section 36, is higher than the average flow velocity of the exhaust gas in order to improve the deflection of the reducing agent 50 or the precursor substance of the reducing agent 50 in the deflection region 47. In the embodiment shown, the baffle 57 tapers at an end facing the impingement body 44.

The guiding device 57 is preferably fixedly connected to the turbine wheel 34 and rotates together with the turbine wheel 34 as well as together with the swirl atomizer 43, thus minimizing flow losses.

Although the connection of the guiding device 57 to the turbine wheel 34 is preferred, it is also possible for the guiding device 57 to be fixed to the turbine housing 33, i.e. to be of a fixed design.

FIGS. 17 and 18 show embodiments of an exhaust gas turbine 31 according to the invention, in which the metering device 42 supplies the reducing agent 50 or the precursor substance of the reducing agent 50 to the swirl atomizer 43 perpendicular to the direction of flow of the expanded exhaust gas or in the direction of flow of the exhaust gas to be expanded and perpendicular to the direction of the axis of rotation R of the turbine rotor 34 and thus of the swirl atomizer 43. The swirl atomizers 43 of FIGS. 17 and 18 do not require a cavity; rather, the reducing agent 50 or the precursor substance thereof is guided along an outer surface 58 of the swirl atomizer 43, which is contoured in a truncated cone shape in FIG. 17 and in a cone shape in FIG. 18. In FIG. 17, the diameter of the swirl atomizer 43, which is contoured in the manner of a truncated cone, widens when viewed in the direction of flow of the expanded exhaust gas, whereas in FIG. 18, the diameter of the swirl atomizer 43, which is contoured in the manner of a cone, tapers when viewed in the direction of flow of the expanded exhaust gas.

On the outer surface 58 of the swirl atomizer 43 guiding the reducing agent 50 or the precursor substance of the reducing agent 50, guide grooves or guide grooves can in turn be formed which extend in the longitudinal direction or in the flow direction of the expanded exhaust gas and serve to guide the reducing agent 50 to be atomized or the precursor substance to be atomized.

In the embodiments of FIGS. 15, 16, 17 and 18, the details of the impingement body 44 described with reference to FIGS. 1 to 4 are preferably used.

In all of the embodiments of the invention described above, it is possible that the swirl atomizer 43 and/or the metering device 42 and/or the impingement body 44 is coated with a hydrophobic coating and/or a catalytically active coating, at least in sections.

A hydrophobic coating may be a coating of nanoparticles consisting of $TiO_2$, $Al_2O_3$ and/or $SiO_2$. Such a hydrophobic coating may simultaneously have catalytically active properties, and then comprise, for example, $SiO_2$-stabilized $TiO_2$ or $WO_3$.

Preferably, the metering device 42 and/or the swirl atomizer 43 and/or the impingement body 44 are made at least in sections of a stainless steel, in particular an austenitic stainless steel. In this way, corrosion of these assemblies can be prevented.

It is possible to manufacture these assemblies only in the area of their surfaces from stainless steel, preferably austenitic stainless steel, and to manufacture them in the interior from a material of lower value, for example from a cast steel or black steel. This can reduce manufacturing costs.

All of the above-described design details of the gas turbines 31 according to the invention serve the purpose of counteracting the formation of deposits of the reducing agent or the precursor substance of the reducing agent on assemblies of the exhaust gas turbine 31, in particular on the swirl atomizer 43 and/or the metering device 42 and/or the baffle 44.

This risk can be further reduced if the exhaust gas turbine is operated as described below.

In a first embodiment according to the invention of a method for operating the gas turbines 31 described above, it is provided to adjust a viscosity of an aqueous reducing agent solution or an aqueous solution of the precursor substance of the reducing agent and water to at least 1.33 mPas, preferably to at least 1.35 mPas, particularly preferably to at least 1.38 mPas. This is preferably done by adjusting a concentration of the reducing agent in the aqueous reducing agent solution or of the precursor substance in the solution from the precursor substance to at least 35%, preferably to at least 37%, particularly preferably to at least 39%.

According to a further process aspect according to the invention, which can be used in combination or also alone, it is provided that the amount of the reducing agent 50 introduced into the expanded exhaust gas via the metering device 42 or the amount of the introduced precursor substance of the reducing agent is determined as a function of the rotational speed of the exhaust gas turbine 31 or as a function of a rotational speed of an internal combustion engine interacting therewith and/or as a function of a power of the exhaust gas turbine 31 or a power of the internal combustion engine interacting therewith and/or as a function of a temperature of the exhaust gas. In this context, it can be provided that if the rotational speed of the exhaust gas turbine or of the internal combustion engine and/or the power of the exhaust gas turbine or of the internal combustion engine and/or the exhaust gas temperature falls below a respective limit value, the introduction of the reducing agent or of the precursor substance of the reducing agent into the exhaust gas is stopped. Above the respective limit value, the amount of reducing agent or precursor substance introduced can be increased with increasing speed and/or power and/or exhaust gas temperature, in particular linearly or in steps. After stopping the introduction of reducing agent or precursor substance of the reducing agent, the metering device is preferably blown on and/or blown free with compressed air or exhaust gas in order to remove reducing agent or precursor substance of the reducing agent from the same.

LIST OF REFERENCE SIGNS 30 exhaust gas turbocharger
31 exhaust gas turbine 32 compressor
33 turbine housing
34 turbine rotor
35 inflow housing section
36 outflow housing section
37 compressor housing
38 compressor rotor
39 shaft
40 bearing housing
41 muffler
42 metering device
43 swirl atomizer
44 impingement body
45 sealing body
46 gap
47 deflection area
48 feed device
49 exhaust gas
50 reducing agent
51 cavity
52 wall
53 wall
54 opening
55 partition wall
56 wall
57 guiding device
58 surface

The invention claimed is:

1. An exhaust gas turbine for expanding exhaust gas, comprising:
   a turbine housing having an inflow housing section for exhaust gas to be expanded and an outflow housing section for expanded exhaust gas;
   a turbine rotor received in said turbine housing, said turbine rotor being rotatable about an axis of rotation;
   a metering device for a reducing agent or a precursor substance of a reducing agent, the reducing agent or the precursor substance being introduced into the expanded exhaust gas via said metering device,
   a swirl atomizer, rotating together with the turbine rotor, said swirl atomizer engaging said turbine rotor at a downstream, hub-side portion of said turbine rotor, said swirl atomizer configured to atomize the reducing agent or the precursor substance in the expanded exhaust gas;
   an impingement body for the reducing agent or the precursor substance introduced into the exhaust gas and atomized, said impingement body arranged downstream of said turbine rotor, in extension of, and crossing, the axis of rotation of said turbine rotor, at a defined distance from said swirl atomizer.

2. The exhaust gas turbine according to claim 1, wherein said defined distance of said impingement body from said swirl atomizer corresponds to a maximum of 6 times a diameter of said turbine rotor.

3. The exhaust gas turbine according to claim 1, wherein said impingement body is arranged in a deflection region of said outflow housing section of said turbine housing, the expanded exhaust gas being deflectable in said deflection region by at least 70° with respect to the axis of rotation of said turbine rotor.

4. The exhaust gas turbine according to claim 1, wherein said impingement body is contoured in a plate-like or flat manner, or said impingement body is contoured in a trough-like or concavely curved manner.

5. The exhaust gas turbine according to claim 1, wherein said impingement body is a separate assembly mounted on said turbine housing.

6. The exhaust gas turbine according to claim 1, wherein said impingement body is thermally decoupled from said turbine housing.

7. The exhaust gas turbine according to claim 1, wherein said impingement body is flowed against on a first side by the exhaust gas expanded in the exhaust gas turbine with the reducing agent or the precursor substance atomized in the expanded exhaust gas, and in that said impingement body is flowed against on an opposite second side by exhaust gas upstream of the exhaust turbine but not expanded in the exhaust gas turbine.

8. The exhaust gas turbine according to claim 1, wherein:
   said metering device is configured to supply the reducing agent or the precursor substance to said swirl atomizer in the opposite direction to the flow direction of the expanded exhaust gas and in the direction of the axis of rotation of said turbine rotor through a baffle body; or
   said metering device is configured to supply the reducing agent or the precursor substance to the swirl atomizer in the direction of flow of the expanded exhaust gas and in the direction of the axis of rotation of said turbine rotor through a hub of said turbine rotor; or
   said metering device is configured to supply the reducing agent or the precursor substance to said swirl atomizer in the direction of flow of the exhaust gas to be expanded and perpendicular to the direction of the axis of rotation of said turbine rotor.

9. The exhaust gas turbine according to claim 1, wherein said swirl atomizer has guide grooves and/or guide slots for the reducing agent or the precursor substance on a surface guiding the reducing agent or the precursor substance.

10. The exhaust gas turbine according to claim 1, wherein at least one of said metering device, said swirl atomizer or said swirl body is:
   coated with a hydrophobic coating at least in sections; or
   coated with a catalytically active coating at least in sections; or
   composed at least in sections of a stainless steel.

11. An exhaust gas turbine for expanding exhaust gas, comprising:
   a turbine housing having an inflow housing section for exhaust gas to be expanded and an outflow housing section for expanded exhaust gas,
   a turbine rotor accommodated by the turbine housing, the turbine rotor being rotatable about an axis of rotation;
   a metering device for a reducing agent or a precursor substance of a reducing agent, the reducing agent or the precursor substance being introduced into the expanded exhaust gas via said metering device;
   a swirl atomizer, connected and rotating together with the turbine rotor, said swirl atomizer engaging said turbine rotor at a downstream, hub-side portion of said turbine rotor, said swirl atomizer configured to atomize the reducing agent or the precursor substance in the expanded exhaust gas;
   said swirl atomizer including:
      a cavity;
      openings on a wall bounding the cavity, said wall extending parallel to the axis of rotation of said turbine rotor or extending at an acute angle of at most 40° to the axis of rotation of the turbine rotor, via which openings the reducing agent or the precursor substance enters the expanded exhaust gas from said cavity; and an impingement body arranged downstream of said turbine rotor, in extension of, and crossing, the axis of rotation of said turbine rotor, at a defined distance from said swirl atomizer.

12. The exhaust gas turbine according to claim 11, wherein the respective wall with the openings extends at an acute angle of at most 30° to the axis of rotation of the turbine rotor.

13. The exhaust gas turbine according to claim 11, wherein the reducing agent or the precursor substance of the reducing agent passes out of the cavity of the swirl atomizer and into the expanded exhaust gas in at least two planes offset as seen in the direction of the axis of rotation of the turbine rotor, partition walls projecting inwards into the swirl atomizer.

14. The exhaust gas turbine according to claim 11, wherein at least one opening has a longitudinal central axis deviating from other openings.

15. The exhaust gas turbine according to claim 11, wherein said swirl atomizer is surrounded radially on the outside by a guiding device at least in sections.

\* \* \* \* \*